United States Patent
Cho et al.

(10) Patent No.: US 11,915,525 B2
(45) Date of Patent: Feb. 27, 2024

(54) METHOD AND APPARATUS THAT DETECTS SPOOFING OF BIOMETRIC INFORMATION

(71) Applicant: Samsung Electronics Co., Ltd., Suwon-si (KR)

(72) Inventors: Sung-Jae Cho, Hwaseong-si (KR); Kyuhong Kim, Seoul (KR); Sungun Park, Suwon-si (KR); Geuntae Bae, Seoul (KR); Jaejoon Han, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 271 days.

(21) Appl. No.: 17/340,389

(22) Filed: Jun. 7, 2021

(65) Prior Publication Data
US 2022/0188556 A1    Jun. 16, 2022

(30) Foreign Application Priority Data

Dec. 10, 2020  (KR) .................. 10-2020-0172382

(51) Int. Cl.
*G06V 40/40*    (2022.01)
*G06F 21/32*    (2013.01)

(52) U.S. Cl.
CPC .............. *G06V 40/40* (2022.01); *G06F 21/32* (2013.01)

(58) Field of Classification Search
CPC .... G06V 40/40; G06V 10/82; G06V 40/1382; G06V 10/443; G06V 40/12; G06V 40/16; G06V 40/18; G06F 21/32; G06F 18/2413; G06F 21/45
See application file for complete search history.

(56) References Cited

U.S. PATENT DOCUMENTS

| 7,659,851 B2 | 2/2010 | DeJean et al. |
| 7,815,117 B2 | 10/2010 | Tuschel et al. |
| 8,457,367 B1 | 6/2013 | Sipe et al. |
| 9,726,755 B2 | 8/2017 | Kitchens et al. |

(Continued)

FOREIGN PATENT DOCUMENTS

| EP | 3 525 133 A2 | 8/2019 |
| KR | 10-2004-0005266 A | 1/2004 |

(Continued)

OTHER PUBLICATIONS

Extended European Search Report dated Mar. 4, 2022 in counterpart European Patent Application No. 21194586.0 (7 pages in English).

*Primary Examiner* — Helen Zong
(74) *Attorney, Agent, or Firm* — NSIP Law

(57) ABSTRACT

A method and apparatus that detects whether biometric information is spoofed is provided. The method receives, from a sensor, first feature information including a static feature associated with biometric information of a user, and a dynamic feature obtained based on images related to the biometric information, detects whether the biometric information is spoofed based on a first score calculated based on the first feature information, fuses the first score with a second score calculated based on second feature information extracted from the images, based on a result of the detecting that the biometric information is spoofed based on the first score, and detects that the biometric information is spoofed based on a fused score.

20 Claims, 11 Drawing Sheets

(56) References Cited

U.S. PATENT DOCUMENTS

| | | | |
|---|---|---|---|
| 10,262,188 B2 | 4/2019 | Agassy et al. | |
| 2016/0070967 A1 | 3/2016 | Du et al. | |
| 2016/0070976 A1* | 3/2016 | Aoba | G06V 10/776 |
| | | | 382/180 |
| 2018/0032815 A1* | 2/2018 | Lee | G06V 40/193 |
| 2020/0026939 A1* | 1/2020 | Sim | G06V 40/172 |
| 2021/0365666 A1 | 11/2021 | Cho et al. | |
| 2023/0114650 A1* | 4/2023 | Keith, Jr. | G06F 21/44 |
| | | | 726/7 |

FOREIGN PATENT DOCUMENTS

| | | |
|---|---|---|
| KR | 10-2005-0106632 A | 11/2005 |
| KR | 10-0745980 B1 | 8/2007 |
| KR | 10-2008-0017763 A | 2/2008 |
| KR | 10-2010-0029604 A | 3/2010 |
| KR | 10-2011-0065690 A | 6/2011 |
| KR | 10-1370514 B1 | 3/2014 |
| KR | 10-1436786 B1 | 9/2014 |
| KR | 10-1798395 B1 | 11/2017 |
| KR | 10-2017-0136692 A | 12/2017 |
| KR | 10-2018-0056043 A | 5/2018 |

\* cited by examiner

METHOD AND APPARATUS THAT DETECTS SPOOFING OF BIOMETRIC INFORMATION

CROSS-REFERENCE TO RELATED APPLICATIONS

This application claims the benefit under 35 USC § 119(a) of Korean Patent Application No. 10-2020-0172382 filed on Dec. 10, 2020, in the Korean Intellectual Property Office, the entire disclosure of which is incorporated herein by reference for all purposes.

BACKGROUND

1. Field

The following description relates to a method and apparatus that detects the spoofing of biometric information.

2. Description of Related Art

Since authentication through biometric information is convenient and easy to access, biometrics authentication has been introduced in various fields. Typically, biometric authentication includes the matching process of verifying whether a user attempting authentication has the authority to access predetermined information, and the anti-spoofing (ASP) process of determining whether biometric information is forged/spoofed.

Spoofing is performed by mimicking, falsifying, or duplicating biometric information of a user to attempt authentication. Thus, if spoofing is determined using only images, it is difficult to improve the accuracy of spoofing detection due to insufficient information. Therefore, the use of additional information in addition to the images may help to improve the accuracy. In this case, the accuracy may be improved through information of various dimensions when the additional information is used. However, if the accuracy of the additional information is low, the fusion between the images and the additional information may rather decrease the detection performance.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a biometric information spoofing detection method, the method including receiving, from a sensor, first feature information including a static feature associated with biometric information of a user, and a dynamic feature obtained based on images associated with the biometric information; determining whether the biometric information is spoofed based on a first score calculated from the first feature information; fusing the calculated first score with a second score calculated from second feature information extracted from the images, based on a result of the determining whether the biometric information is spoofed based on the first score; and determining that the biometric information is spoofed based on the fused first score and second score.

The determining whether the biometric information is spoofed based on the first score may include calculating the first score based on the first feature information; determining whether the first score is in a first threshold range for an early decision that the biometric information is spoofed; and determining whether the biometric information is spoofed based on the first score, in response to the determining that the first score is in the first threshold range, wherein the fusing of the calculated first score with the second score, and the detecting that the biometric information is spoofed based on the fused score is not performed, in response to the determination that the first score falls within the first threshold range.

The receiving of the first feature information may include receiving the static feature from the sensor that senses the biometric information of the user; and receiving the dynamic feature based on a difference between image features extracted from the images.

The receiving of the dynamic feature may include receiving the images; extracting the image features from the images; and generating the dynamic feature based on a difference between the extracted image features.

The receiving of the images may include one of receiving the images by sequentially capturing the images with a time difference between the images with the sensor; and receiving the images by performing image processing on an image captured with the sensor.

The determining whether the biometric information is spoofed based on the first score, may include classifying the biometric information corresponding to the first score as spoof information or live information based on a trained classifier.

The fusing of the first score with the second score may include fusing the first score with the second score in response to a determination that the first score is not within a first threshold range for an early decision that the biometric information is spoofed.

The method may further include extracting the second feature information from the images; and calculating the second score based on the extracted second feature information, wherein the fusing of the first score and the second score may further include when a determination that the biometric information is spoofed is not established from the first score, determining whether to fuse the first score with the second score; and fusing the first score with the second score based on a determination to fuse the first score with the second score.

The determining whether to fuse the first score with the second score may include determining whether to fuse the first score with the second score based on a determination that the first score is within a second threshold range.

The fusing of the first score with the second score may include fusing the first score that is within the second threshold range with the second score.

The sensor may include any one or any combination of an ultrasonic fingerprint sensor, a depth sensor, and an image sensor.

The biometric information may include one of a fingerprint, an iris, and a face of the user.

In a general aspect, an apparatus that detects whether biometric information is spoofed, the apparatus includes a sensor, configured to sense biometric information of a user; a communication interface, configured to receive, from the sensor, a static feature associated with the biometric information of the user, and images associated with the biometric information of the user; and a processor, configured to: receive first feature information including the static feature, and a dynamic feature obtained based on the images, determine whether the biometric information is spoofed based on a first score calculated based on the first feature information, fuse the calculated first score with a second score calculated based on second feature information extracted from the images to obtain a fused score, based on a result of the determining that the biometric information is spoofed based on the first score, and determine that the biometric information is spoofed based on the fused first score and the second score.

The processor may be further configured to calculate the first score based on the first feature information, determine whether the first score is in a first threshold range for an early decision that the biometric information is spoofed, determine whether the biometric information is spoofed based on the first score, in response to the determining that the first score is in the first threshold range, and omit the fusing of the first score with the second score and the determining that the biometric information is spoofed based on the fused score, in response to the determining that the first score is in the first threshold range.

The processor may be further configured to receive the static feature from the sensor that senses the biometric information of the user, and receive the dynamic feature based on a difference between image features extracted from the images.

The processor may be further configured to receive the images, extract the image features from the images, and generate the dynamic feature based on a difference between the extracted image features.

The processor may be further configured to receive the images by sequentially capturing the images with a time difference between the images with the sensor, and receive the images by performing image processing on an image captured with the sensor.

The processor may be further configured to classify the biometric information corresponding to the first score as spoof information or live information based on a trained classifier.

The processor may be further configured to fuse the first score with the second score in response to a determination that the first score is not within a first threshold range for an early decision that the biometric information is spoofed.

The processor may be further configured to extract the second feature information from the images, and calculate the second score based on the extracted second feature information, and when a determination that the biometric information is spoofed is not established from the first score, determine whether to fuse the first score with the second score, and fuse the first score with the second score based on a determination to fuse the first score with the second score.

The processor may be further configured to determine whether to fuse the first score with the second score based on a determination that the first score is within a second threshold range.

The processor may be further configured to fuse the first score that is within the second threshold range with the second score.

The sensor may include any one or any combination of an ultrasonic fingerprint sensor, a depth sensor, and an image sensor.

The biometric information may include one of a fingerprint, an iris, and a face of the user.

The apparatus may further include an output device, configured to output a notification that the biometric information is spoofed.

In a general aspect, an electronic device includes a sensor, configured to capture biometric information of a user; a detection apparatus, configured to receive, from the sensor, a static feature associated with the biometric information, and a dynamic feature associated with the biometric information; and a processor, configured to: generate first feature information based on the static feature and the dynamic feature; calculate a first score based on the first feature information, and determine whether the biometric information is spoofed based on the first score; and in response to a non-determination that the biometric information is spoofed based on the first score, the processor is further configured to: calculate a second score based on second feature information, fuse the first score and the second score, and determine spoofing of the biometric information based on the fused score.

The dynamic feature may be extracted based on a difference between image features of multiple captured images.

The processor may be further configured to classify the biometric information corresponding to the first score as spoof information or live information based on a trained classifier.

Other features and aspects will be apparent from the following detailed description, the drawings, and the claims.

BRIEF DESCRIPTION OF DRAWINGS

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

Figure 1:
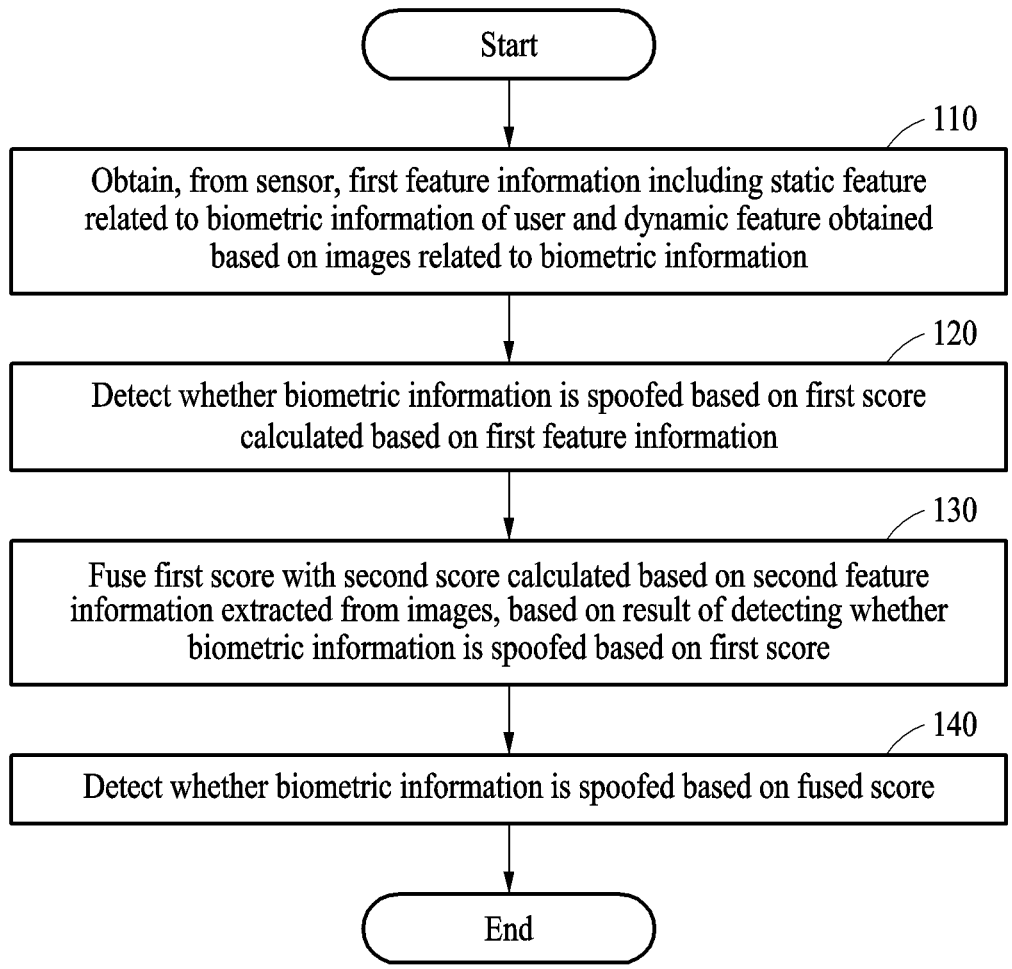
FIG. 1 illustrates an example method of detecting whether biometric information is spoofed, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example method of detecting whether biometric information is spoofed, in accordance with one or more embodiments. Referring to FIG. 1, an apparatus that detects whether biometric information is spoofed (hereinafter, referred to as the "detection apparatus") may detect whether biometric information is spoofed through the process of operations 110 to 140. In an example, it is assumed that the operations described below are performed after the matching process of verifying whether a user attempting user authentication with biometric information in the biometrics authentication process has the authority to access a system, that is, is an enrolled user of the system. However, examples are not limited thereto.

In operation 110, the detection apparatus obtains, from a sensor, first feature information including a static feature related to biometric information of a user and a dynamic feature obtained based on images related to the biometric information. The sensor may include, as non-limiting examples, any one or any combination of an ultrasonic fingerprint sensor, a depth sensor, and an image sensor. However, examples are not limited thereto. Among the sensors, any one sensor or two or more sensors may be used. The first feature information is information that may be obtained directly from the sensor, and may also be referred to as, for example, a "hand-crafted feature (HCF)". Hereinafter, the term "first feature information" and the term "HCF" may be used interchangeably. The static feature, the dynamic feature, and the process of obtaining the first feature information by the detection apparatus will be described in more detail with reference to FIG. 3.

In operation 120, the detection apparatus may detect whether the biometric information is spoofed based on a first score calculated based on the first feature information obtained in operation 110. Here, "spoofed" biometric information refers to fake or false biometric information other than live biometric information, and may be construed as including, as examples, duplication, forgery, and falsification of biometric information.

In operation 120, for example, the detection apparatus may calculate the first score based on the first feature information, and determine whether the first score falls within a first threshold range for an early decision of whether the biometric information is spoofed. The first score may correspond to, for example, a similarity score calculated based on a result of comparing the first feature information to authentication information (for example, feature information of a fingerprint image) included in an enrollment database. However, examples are not limited thereto. The first score may be calculated by, for example, a trained classifier or deep neural network. However, examples are not limited thereto. In this example, the first threshold range may be construed as a criterion for clearly determining whether the first score falls within a range in which biometric information is determined as live information, or falls within a range in which biometric information is determined as spoof information. The first threshold range may be determined based on, for example, a first threshold corresponding to the maximum probability that the biometric information is determined as spoof information based on the first score and a second threshold corresponding to the minimum probability that the biometric information is determined as live information based on the first score in the probability distribution of the first score.

In an example, in response to the determination that the first score falls within the first threshold range, the detection apparatus may detect whether the biometric information is spoofed based on the first score. The detection apparatus may detect whether the biometric information is spoofed by classifying the biometric information corresponding to the first score as spoof information or live information using a neural network such as the trained classifier. However, examples are not limited thereto. In response to the determination that the first score falls within the first threshold range, operation 130 of fusing the first score with a second score, and operation 140 of detecting whether the biometric information is spoofed based on a fused score may not be performed, and a determination that the biometric information is spoofed may be early detected based on the first score.

Accordingly, the process of detecting whether the biometric information is spoofed based on the first score may correspond to the "early decision process" 810 which will be described later with reference to FIG. 8. The detection apparatus may quickly detect whether the biometric information is spoofed based on a relatively small amount of information such as the first score, through a small-sized neural network. An example of detecting whether the biometric information is spoofed based on the first score by the detection apparatus will be described in more detail with reference to FIG. 4. Additionally, the first threshold range will be described in more detail with reference to FIG. 5.

In operation 130, the detection apparatus may fuse the first score with a second score if a determination cannot be made that the biometric information is spoofed based on the first score in operation 120. In operation 130, the detection apparatus may extract second feature information from images. Since the second feature information is extracted from the images, the second feature information may also be referred to as an "image feature". The detection apparatus may calculate the second score based on the second feature information. The detection apparatus may determine whether to fuse the first score with the second score calculated based on the second feature information extracted from the images, and fuse the first score with the second score in response to determining to fuse the first score with the second score. In an example, the detection apparatus may determine whether to fuse the first score with the second score based on whether the first score falls within a second threshold range in which the confidence thereof is accepted. An example of fusing the first score with the second score by the detection apparatus will be described in more detail with reference to FIG. 6.

In operation 140, the detection apparatus detects whether the biometric information is spoofed based on a fused score obtained in operation 130. The detection apparatus may detect whether the biometric information is spoofed through, for example, a multi-stage decision logic shown in FIG. 8. The process of detecting whether the biometric information is spoofed based on the fused score by the detection apparatus will be described in more detail through the "score fusion process" shown in FIG. 8.

The detection apparatus may, for example, output a result of detecting whether the biometric information is spoofed in operation 140, through an output device (for example, 1170 in FIG. 11) such as a display and/or a speaker. Alternatively, the detection apparatus may match a result of detecting whether the biometric information is spoofed in operation 140 to the biometric information, and output a matching result to the outside of the detection apparatus.

For example, the detection apparatus may improve the anti-spoofing efficiency and accuracy in a mobile device having limited resources through the multi-stage decision logic which will be described with reference to FIG. 8.

Hereinafter, the configuration of the detection apparatus will be described with reference to FIG. 2.

Figure 2:
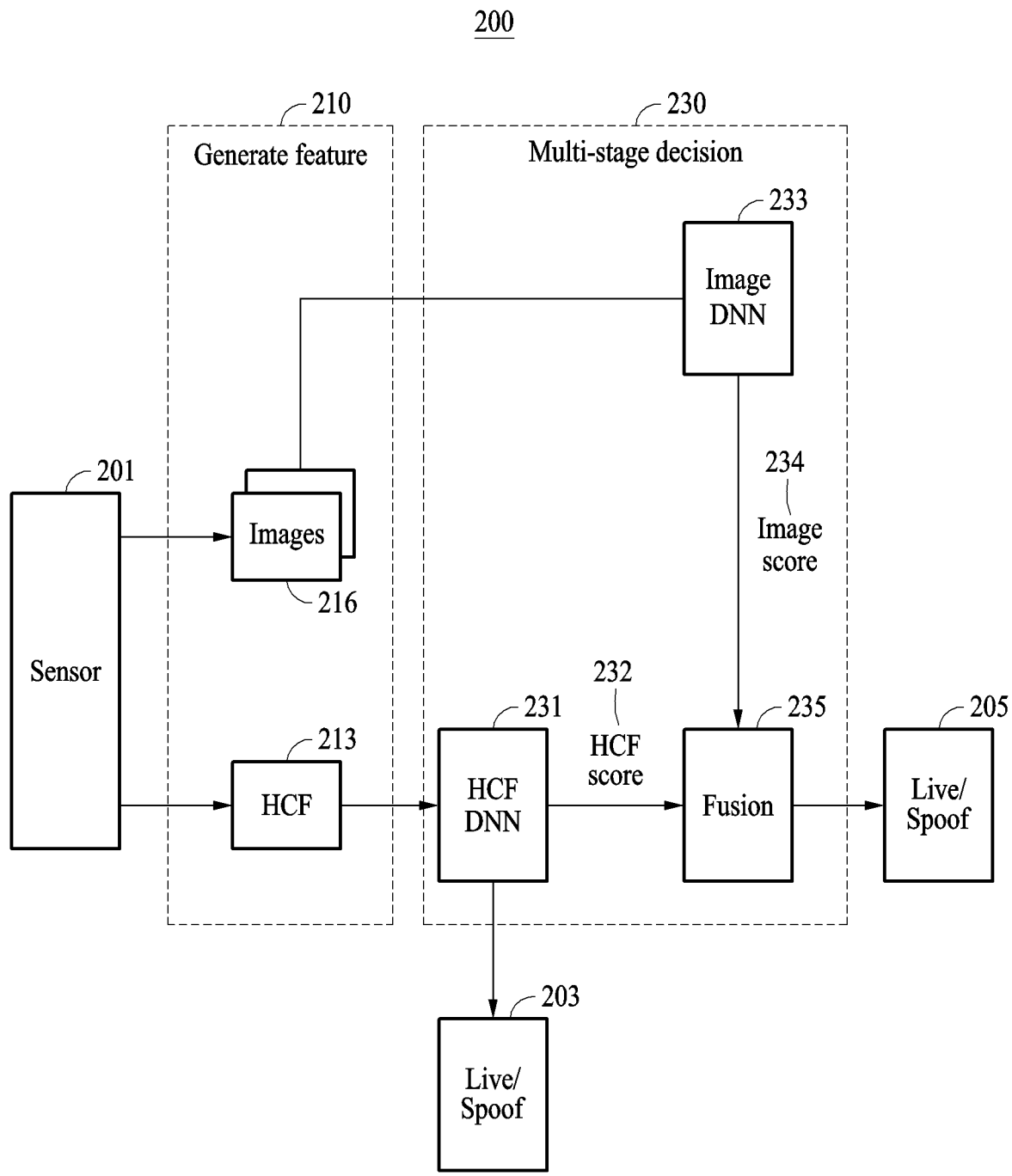
FIG. 2 illustrates an example apparatus that detects whether biometric information is spoofed, in accordance with one or more embodiments.

FIG. 2 illustrates an example of an apparatus that detects whether biometric information is spoofed.

Referring to FIG. 2, a detection apparatus 200 may improve the speed of detecting whether biometric information is spoofed, and may improve the accuracy of determining whether the biometric information is spoofed when a user requests authentication using the biometric information, and may perform, for example, the process 210 of generating features, and the process 230 of determining whether the biometric information is spoofed through multi stages. The process 210 of generating features may be construed as including extraction of the features. Additionally, the process 230 of determining whether the biometric information is spoofed may be construed as including detection of whether the biometric information is spoofed.

In the process 210, the detection apparatus 200 may extract, for example, a static feature related to biometric information of a user and a dynamic feature based on images related to the biometric information. The static feature may include physical measures that are obtainable directly from a sensor 201, such as, for example, oxygen saturation, impedance, face depth information, electrical resistance, temperature (body temperature), heart rate, and the like. However, examples are not limited thereto. The static feature may also be referred to as a "physical feature" in the sense that it includes a physical measure sensed by the sensor 201. A different physical feature may be sensed by each sensor 201. In an example, when the sensor 201 is an ultrasonic fingerprint sensor, the sensor 201 may obtain fingerprint image data and impedance information that is a physical feature of a fingerprint. Since impedance varies according to the characteristics of a medium, the impedance information varies according to the material of a forgery fingerprint. Thus, the impedance information may be utilized to determine a forgery fingerprint. Alternatively, when the sensor 201 is an image sensor, a difference between a plurality of pieces of image data obtained through the sensor 201 may be utilized as a feature to determine a forgery fingerprint. The image data obtained in the manner described above may be utilized as static features or dynamic features.

In an example, the sensor 201 may include a facial recognition sensor or an iris scan sensor, but is not limited thereto.

In an example, the sensor 201 may directly obtain images and output a dynamic feature calculated based on a difference between image features extracted respectively from the images. Alternatively, the sensor 201 may obtain images related to biometric information through photographing or capturing. In this example, the images obtained through the sensor 201 may be, for example, fingerprint images, eye (iris) images, and/or face images. The images obtained through the sensor 201 may be full images or partial images.

When the sensor 201 obtains the images, the detection apparatus 200 may respectively extract the image features from the images, and generate the dynamic feature based on the difference between the image features. In this example, the detection apparatus 200 may calculate the dynamic feature from the images by using various feature detection techniques used for image processing, not through a separate neural network. Since the dynamic feature obtained in the manner described above does not have to be extracted again through a separate neural network, the time for feature extraction may be reduced. The static feature and dynamic feature extracted in the process 210 may correspond to the first feature information described above, that is, an HCF 213.

Additionally, in the process 210, the detection apparatus 200 may obtain images 216. The images 216 may be, for example, the images obtained through detection by the sensor 201, or images that are separately obtained.

When the HCF 213 is generated in the process 210, the detection apparatus 200 may detect whether the biometric information is spoofed by utilizing the HCF 213 in the process 230. In this example, the detection apparatus 200 may determine whether the biometric information is spoofed through multiple stages (for example, two stages) by utilizing the HCF 213 in the process 230.

In the first stage, the detection apparatus 200 may quickly determine whether the biometric information is spoofed with respect to the HCF 213 using small feature information and a small-sized network. In an example, the detection apparatus 200 may calculate an HCF score 232 based on the HCF 213 through an HCF deep neural network (DNN) 231 and detect whether the biometric information is spoofed based on the HCF score 232, in operation 203. The DNN may include a plurality of layers. For example, the deep neural network 231 may include an input layer to which input data is applied, an output layer for outputting a result derived through prediction based on training and the input data, and a plurality of hidden layers for performing a neural network operation between the input layer and the output layer.

Technological automation of pattern recognition or analyses, for example, has been implemented through processor implemented neural network models, as specialized computational architectures, that after substantial training may provide computationally intuitive mappings between input patterns and output patterns or pattern recognitions of input patterns. The trained capability of generating such mappings or performing such pattern recognitions may be referred to as a learning capability of the neural network. Such trained capabilities may also enable the specialized computational architecture to classify such an input pattern, or portion of the input pattern, as a member that belongs to one or more predetermined groups. Further, because of the specialized training, such specially trained neural network may thereby have a generalization capability of generating a relatively accurate or reliable output with respect to an input pattern that the neural network may not have been trained for, for example.

In such an example, the DNN 231 may be one or more of a fully connected network, a convolution neural network, a recurrent neural network, and the like, or may include different or overlapping neural network portions respectively with such full, convolutional, or recurrent connections, according to an algorithm used to process information. The DNN 231 may be configured to perform, as non-limiting examples, object classification, object recognition, voice recognition, and image recognition by mutually mapping input data and output data in a nonlinear relationship based on deep learning. Such deep learning is indicative of processor implemented machine learning schemes for solving issues, such as issues related to automated image or speech recognition from a data set, as non-limiting examples. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The detection apparatus 200 may determine whether the biometric information is live information or spoof information based on the HCF score 232. The HCF score 232 corresponds to the first score described above. Thus, the term "HCF score" and the term "first score" may be used interchangeably. The HCF 213 has a relatively small amount of information compared to the images 216. Therefore, the detection apparatus 200 may detect whether the biometric information is spoofed only when whether the biometric information is live or spoof information is clearly determined based on the HCF score 232 in the first stage. As such, the process of immediately detecting whether the biometric information is spoofed based on the HCF score 232 may be referred to as the "early decision" process.

In an example, if it is not possible to clearly determine whether the biometric information is spoofed based on the HCF score 232 in the first stage, the detection apparatus 200 may defer a determination on whether the biometric information is spoofed, and transmit the HCF score 232 to the following process of detecting whether the biometric information is spoofed by fusing scores. The HCF data 213 corresponding to an HCF score 232, for which whether the biometric information is spoofed is not determined in the early decision process may be utilized in the following process of detecting whether the biometric information is spoofed based on the images 216. The HCF 213 contains information of a different dimension from the images 216 and thus, may have a complementary relationship with the images 216. Accordingly, the detection apparatus 200 may improve the speed of detecting whether the biometric information is spoofed and the accuracy of spoofing detection through the mutual complementation between the HCF 213 and the images 216. In this example, the images 216 may be, for example, multiple pieces of image data obtained by the image sensor in the process 210, or separate test images. The test images may be, as an example, fingerprint images. The process 230 of detecting whether the biometric information is spoofed through the mutual complementation between the HCF 213 and the images 216, more specifically, between the HCF score 232 and an image score 234, may be referred to as the "multi-modality score fusion" or "score fusion" process.

In the process 230, the detection apparatus 200 may extract image features from the images 216 by implementation of, as an example, an image DNN 233, and calculate the image score 234 based on the image features. The image features may correspond to the second feature information described above. The image score 234 corresponds to the second score described above. Thus, the term "image score" and the term "second score" may be used interchangeably. The detection apparatus 200 may calculate a fused score by fusing the HCF score 232 with the image score 234, in operation 235. In this example, to improve the performance, the detection apparatus 200 may exclude an HCF score 232 the confidence of which is lower than a predetermined criterion from among HCF scores 232 received from the early decision process, and thereby perform score fusion using an HCF score 232 the confidence of which is higher than the predetermined criterion. In this example, the predetermined criterion for determining the confidence of the HCF score 232 may be, for example, a second threshold range. In operation 205, the detection apparatus 200 may detect whether the biometric information is live or spoofed based on the fused score calculated through fusion 235. A multi-stage decision logic in the process 230 will be described in more detail with reference to FIG. 8.

Figure 3:
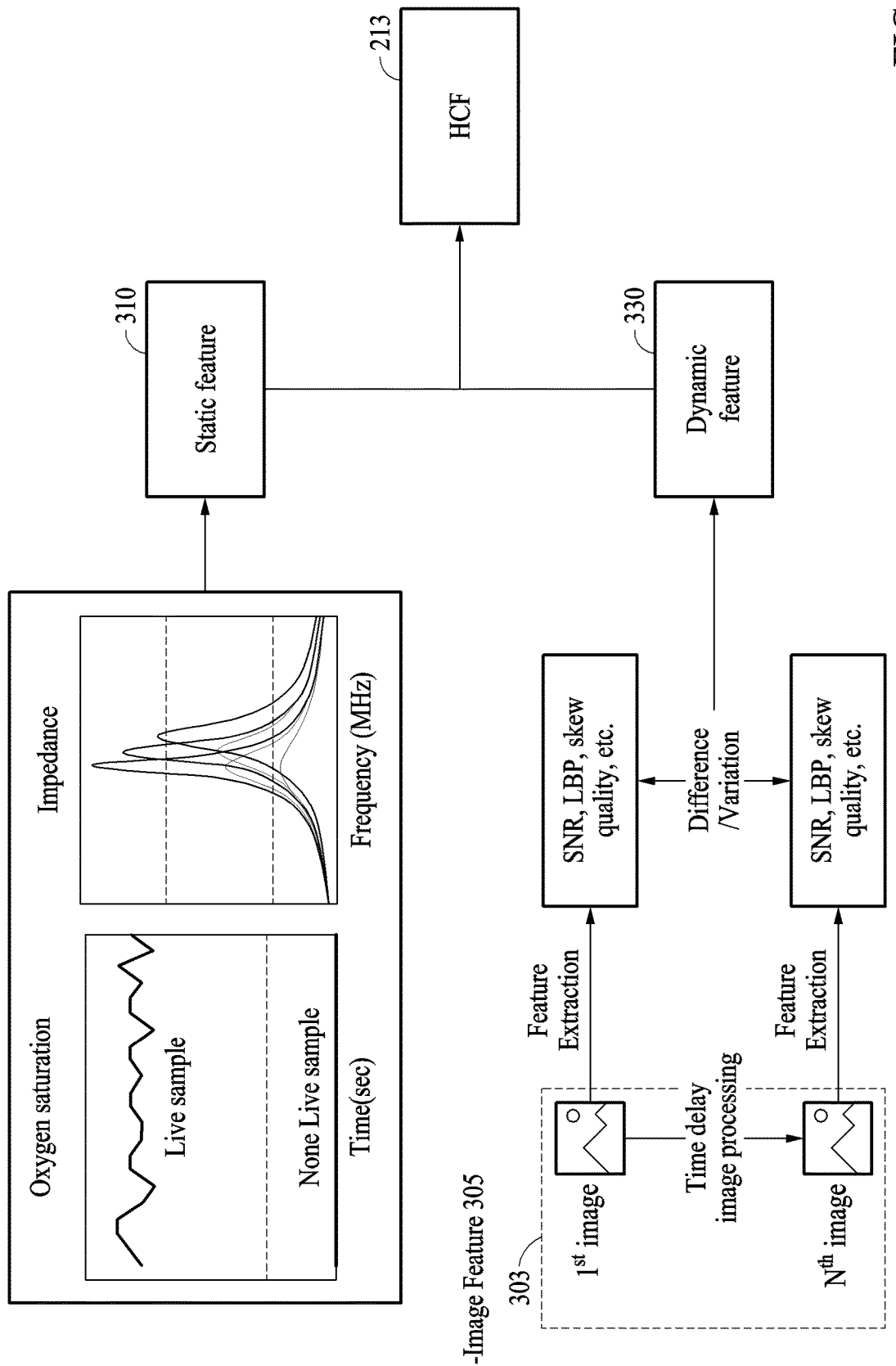
FIG. 3 illustrates an example of obtaining first feature information, in accordance with one or more embodiments.

FIG. 3 illustrates an example of obtaining first feature information. Referring to FIG. 3, the configuration of first feature information is illustrated. The first feature information corresponds to the HCF 213 of FIGS. 2 and 3.

A detection apparatus may obtain physical features 301 and images 303 from a sensor (for example, the sensor 201 of FIG. 2). In an example, the sensor may include a physical sensor that senses the physical features 301 related to biometric information of a user, and a biometric sensor (as non-limiting examples, an ultrasonic fingerprint sensor, an iris scanner, or a facial recognition sensor) that captures the images 303. The images 303 may be full images (for example, full fingerprint images, full facial images, or full iris images) or partial images (for example, partial fingerprint images, partial facial images, or partial iris images). In an example, the images 303 may correspond to the images 216 of FIG. 2.

The detection apparatus may obtain a static feature 310 from the physical features 301. The static feature 310 may be a physical feature 301 obtainable by the sensor, such as oxygen saturation, impedance, temperature, and the like. Further, the detection apparatus may obtain a dynamic feature 330 based on a difference or variation between image features 305 extracted from the images 303.

The detection apparatus may generate the HCF 213 by combining the static feature 310 and the dynamic feature 330. The static feature 310 and the dynamic feature 330 may serve as elements that complement each other. In other words, combining the static feature 310 and the dynamic feature 330 may improve the accuracy of the first feature information (for example, the HCF 213).

For example, the detection apparatus may generate the HCF 213 by making the dimensions of the static feature 310 the same as the dimensions of the dynamic feature 330 and then combining the static feature 310 and the dynamic feature 330. Here, "combining" may correspond to, for example, concatenating or calculating a weighted sum.

In an example, the detection apparatus may generate the HCF 213 by concatenating or adding up an embedding vector corresponding to the static feature 310 and an embedding vector corresponding to the dynamic feature 330. In an example, if the embedding vector corresponding to the static feature 310 is 10-dimensional and the embedding vector corresponding to the dynamic feature 330 is 100-dimensional, the HCF 213 may be 110-dimensional information.

As described above with reference to FIG. 2, the HCF 213 may be utilized for an early decision detection determination. A neural network, (for example, the HCF DNN 231 of FIG. 2) that determines whether biometric information is spoofed based on the HCF 213, may only have to process a relatively small amount of information when compared to a neural network (for example, the image DNN 233 of FIG. 2) that determines whether biometric information is spoofed based on the images 216, and thus, may need less time to determine whether biometric information is spoofed. Additionally, the HCF 213 is generated by combining the static feature 310 and the dynamic feature 330. Since the static feature 310 corresponds to information that is obtainable directly from a sensor, an additional time for feature extraction may not be needed. The feature extraction schemes used to extract the dynamic feature 330 may only have to process a relatively small amount of information when compared to the neural network (for example, the image DNN 233 of FIG. 2) that determines whether biometric information is spoofed based on the images 216.

An example of the process of obtaining the dynamic feature 330 by the detection apparatus is as follows.

The detection apparatus may extract the image features 305 respectively from the images 303. The detection apparatus may extract the image features 305 using feature extraction schemes used for image processing. Here, unlike the image features extracted by the image DNN 233 of FIG. 2, the image features 305 may be extracted in a short time using the following various feature extraction schemes, rather than a deep neural network. The image features 305 may correspond to hand-craft image features shown in FIG. 4. The feature extraction schemes may include, for example, a scheme of extracting a feature vector by normalizing a signal-to-noise ratio (SNR), a scheme of extracting a local binary pattern (LBP) feature, a scheme of extracting a skew, a scheme of measuring an image quality, a scheme of extracting a histogram of oriented gradient (HoG) feature, and a scheme of extracting a blob representing a set of image pixels concatenated to each other.

The detection apparatus may obtain the images 303 from the sensor. The biometric sensor may generate the images 303 by capturing biometric information of the user with a time difference therebetween. At this time, the images 303 may be, for example, an image (for example, a first image) obtained in the matching process of verifying whether the user attempting authentication has the authority to access, and an image (for example, an Nth image) obtained in the anti-spoofing (ASP) process of detecting whether biometric information is spoofed with a time difference thereafter. In this case, N may be 2.

Alternatively, the biometric sensor may generate the images 303 using an image generated by capturing the biometric information of the user and an image obtained by converting the image through image processing. For example, the biometric sensor may generate a second image by performing preprocessing (for example, noise removal or sharpness enhancement) on the first image obtained in the matching process of verifying whether the user attempting authentication has the authority to access predefined or predetermined information.

Figure 4:
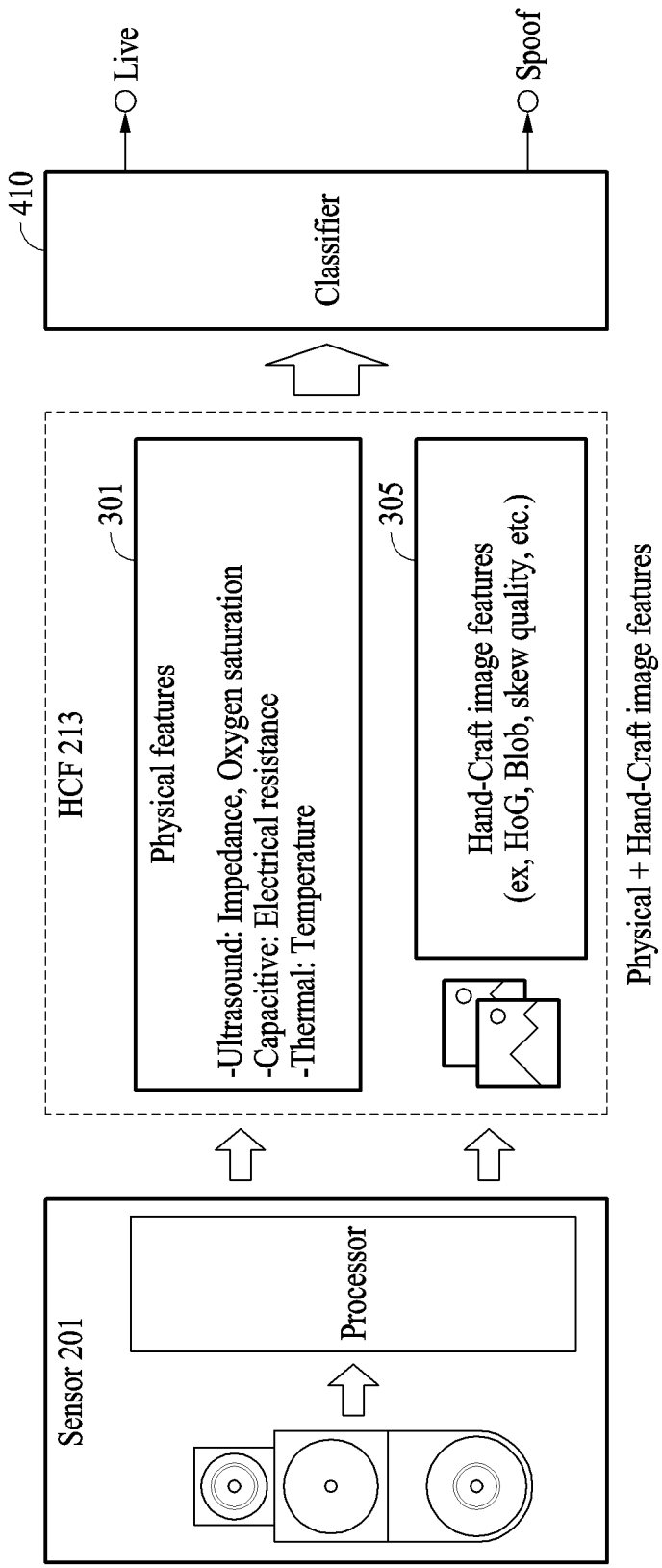
FIG. 4 illustrates an example of detecting whether biometric information is spoofed based on a first score, in accordance with one or more embodiments.

FIG. 4 illustrates an example of detecting whether biometric information is spoofed by a first score, in accordance with one or more embodiments.

Referring to FIG. 4, the process of detecting whether biometric information is spoofed by a classifier 410 based on the HCF 213 obtained from the sensor 201 is illustrated.

A detection apparatus may detect whether biometric information is spoofed by applying the HCF 213, for example, to the classifier 410, wherein the HCF 213 is obtained based on the physical features 301 of biometric information (for example, a fingerprint) being a detection target and the image features 305. In this example, the image features 305 may be, for example, image features extracted from a single image, or dynamic features extracted based on differences between images.

In an example, the classifier 410 may calculate a first score based on the HCF 213 and determine whether the first score falls within a first threshold range. In response to the determination that the first score falls within the first threshold range, the classifier 410 may classify the biometric information corresponding to the first score as live information or spoof information. In this case, the classifier 410 may determine whether the biometric information is spoofed by performing a binary decision between Live or Spoof based on the first score. The first score may be calculated by a regression neural network instead of the classifier 410. When the first score calculated based on the HCF 213 is out of the first threshold range, the detection apparatus may transmit the first score to the multi-modality score fusion process for more specific determination. The first threshold range will be described in detail with reference to FIG. 5.

Figure 5:
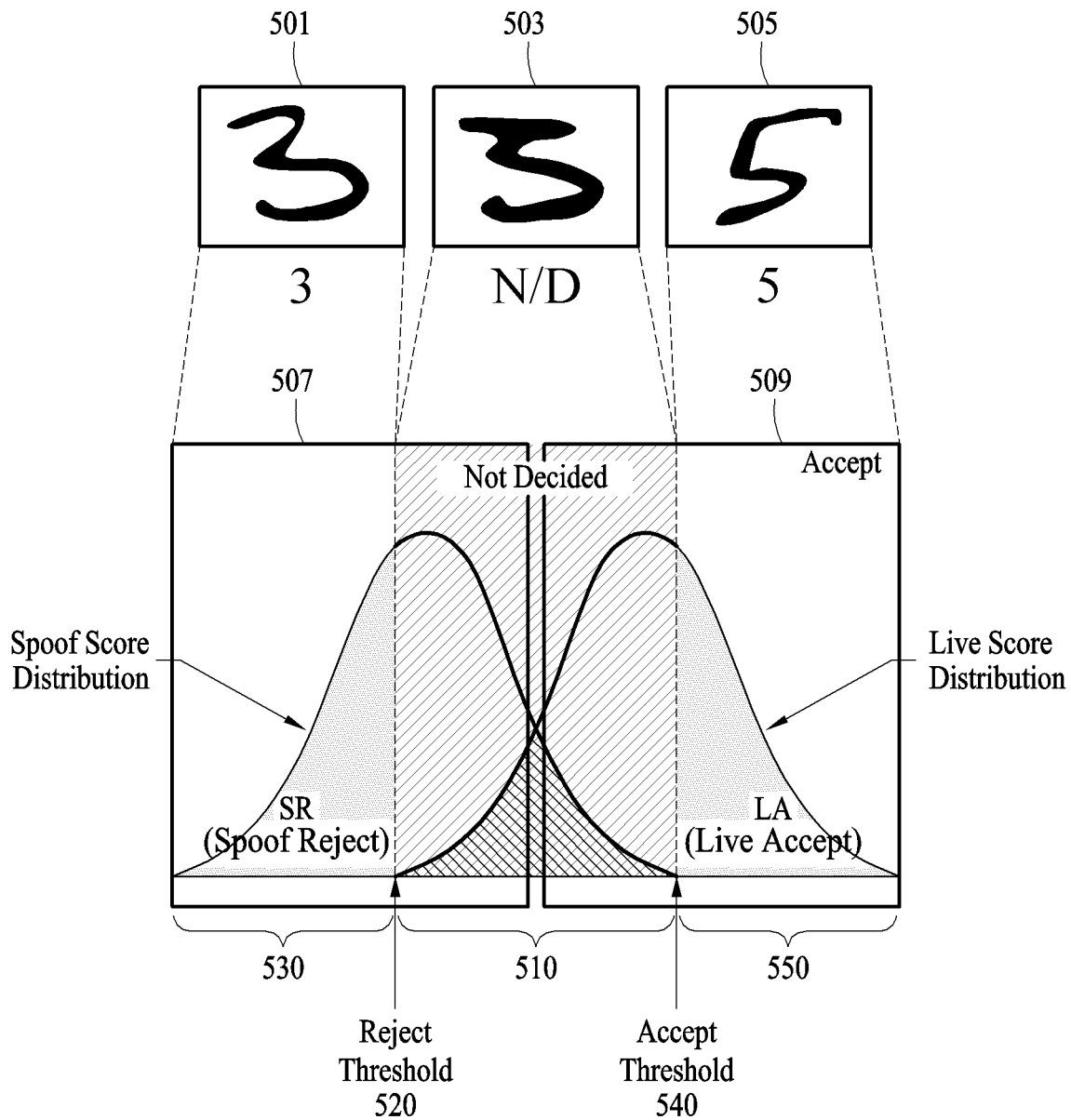
FIG. 5 illustrates an example first threshold range, in accordance with one or more embodiments.

FIG. 5 illustrates an example of a first threshold range, in accordance with one or more embodiments.

Referring to FIG. 5, a graph 507 showing a probability distribution of a first score corresponding to spoof information and a graph 509 showing a probability distribution of a first score corresponding to live information are illustrated.

In an example, it may be assumed that first feature information may be represented as in forms 501, 503, and 505, and "3" in the form 501 corresponds to spoof information, and "5" in the form 505 corresponds to live information. If it is possible to clearly determine whether the first score corresponding to the biometric information falls within the range in which biometric information is determined as live information or falls within the range in which biometric information is determined as spoof information, as in the forms 501 and 505, the detection apparatus may immediately detect whether the biometric information is spoofed based on the first score.

However, if it is difficult to clearly determine whether the information is "3" or "5", as in the form 503, in other words, if it is impossible to clearly determine whether the first score corresponding to the information falls within the range in which biometric information is determined as live information or falls within the range in which biometric information is determined as spoof information, the detection apparatus may not immediately determine whether the biometric information is spoofed based on the first score.

In an example, the first threshold range may correspond to a probability range in which it is possible to clearly determine whether biometric information is spoofed based on the first score. The first threshold range is for distinguishing a first score for which a determination is not made whether biometric information is spoofed ("Not Decided") as in the form 503. If a determination that the biometric information is spoofed is not immediately made based on the first score, the detection apparatus may transmit the first score to the following multi-modality score fusion process.

In FIG. 5, a graph 507 shows a probability distribution of a first score for which the biometric information is determined as spoof information, and a graph 509 shows a probability distribution of a first score for which the biometric information is determined as live information. In this example, a reject threshold 520 in the graph 507 may correspond to a maximum value (Max($Score_{Spoof}$)) of the probability that the first score is determined to fall within the range in which biometric information is clearly determined as spoof information. In addition, an accept threshold 540 in the graph 509 may correspond to a minimum value (Min($Score_{Live}$)) of the probability that the first score is determined to fall within the range in which biometric information is clearly determined as live information.

The first threshold range may be determined based on the reject threshold 520 corresponding to the maximum probability (Max($Score_{Spoof}$)) that the first score is determined to fall within the range in which biometric information is determined as spoof information and the accept threshold 540 corresponding to the minimum probability (Min($Score_{Live}$)) that the first score is determined to fall within the range in which biometric information is determined as live information. The first threshold range may correspond to a section 510 that is greater than the reject threshold 520 in the graph 507 and less than the accept threshold 540 in the graph 509. In the graph 507, if the first score falls within a section 530 that is less than or equal to the reject threshold 520, the first score may be determined to fall within the range in which biometric information is clearly determined as spoof information. Further, in the graph 509, if the first score falls within a section 550 that is greater than or equal to the accept threshold 540, the first score may be determined to fall within the range in which biometric information is clearly determined as live information.

Accordingly, if the first score falls within the section 530 and the section 550, the detection apparatus may determine that the first score falls within the first threshold range. Unlikely, if the first score falls within the section 510, the detection apparatus may determine that the first score does not fall within the first threshold range.

Figure 6:
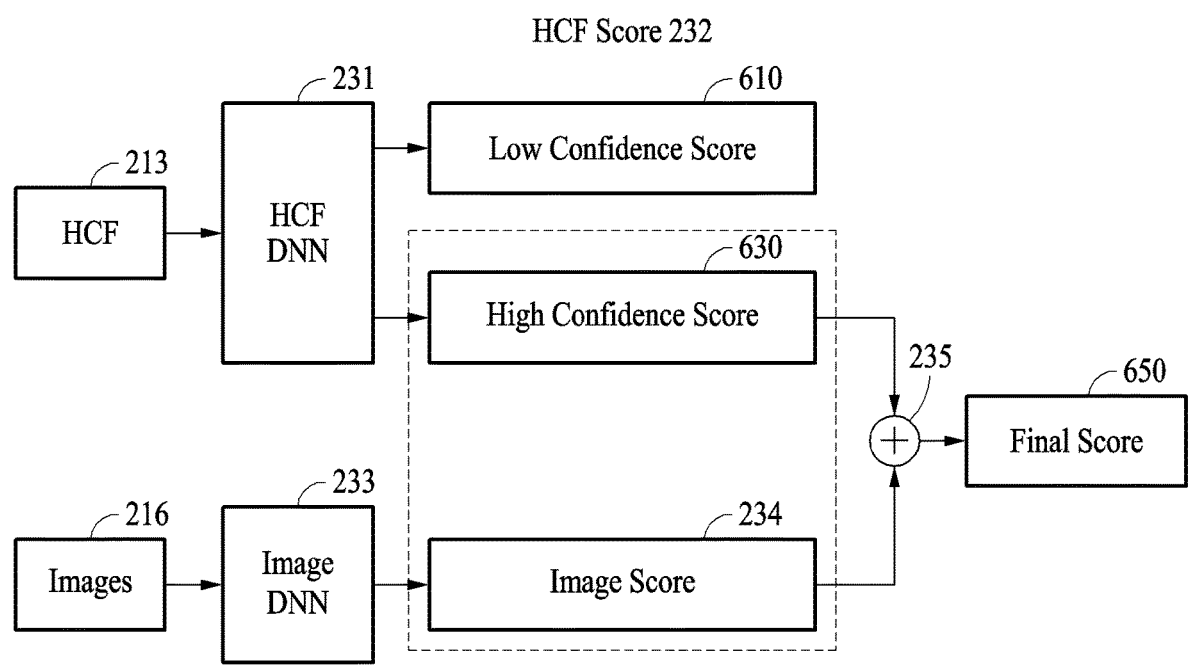
FIG. 6 illustrates an example of fusing a first score with a second score, in accordance with one or more embodiments.

FIG. 6 illustrates an example of fusing a first score with a second score, in accordance with one or more embodiments.

Referring to FIG. 6, the score fusion process is shown.

A detection apparatus may calculate a fused final score 650 by fusing the HCF score 232 calculated by the HCF DNN 231 based on the HCF 213 with the image score 234 calculated by the image DNN 233 based on the images 216.

As described above, since the HCF 213 contains information of a different dimension from the images 216, when a determination is made that biometric information is spoofed using the HCF score 232 and the image score 234 together, the mutual complementation therebetween may improve the speed and accuracy of determining whether biometric information is spoofed.

When the detection apparatus fuses or combines the scores in operation 235, if less accurate scores are fused, the accuracy of the fused final score 650 may be low. Therefore, the detection apparatus may compare HCF scores 232 with a predetermined criterion, thereby classifying the HCF scores 232 into a score 610 the confidence of which is lower than a predetermined criterion (hereinafter, the low confidence score 610) and a score 630 the confidence of which is higher than the predetermined criterion (hereinafter, the high confidence score 630). In this example, the predetermined criterion for determining the confidence of an HCF score 232 may be, for example, a second threshold range in which the confidence of the first score is accepted.

In operation 235, the detection apparatus may exclude the low confidence score 610, and fuse or combine the high confidence score 630 with the image score 234. Through this, the detection apparatus may prevent performance degradation that may occur due to score fusion.

In this example, the predetermined criterion for determining whether the HCF score 232 has a high confidence may be a second threshold range. In an example, the detection apparatus may determine whether to fuse an HCF score 232 with the image Score 234, for example, based on whether the HCF score 232 falls within the second threshold range in which the confidence thereof is accepted. The detection apparatus may fuse the HCF score 232 that falls within the second threshold range (for example, the high confidence score 630) with the image score 234, in operation 235. Here, the second threshold range may be determined, for example, based on a third threshold corresponding to a point at which a false acceptance rate (FAR) and a false rejection rate (FRR) match in the probability distribution of the first score. The second threshold range will be described in detail with reference to FIG. 7.

In an example, if HCF scores 232 are all out of the second threshold range, the detection apparatus may not perform fusion with the image score 234 and may detect whether the biometric information is spoofed based on the image score 234 only.

In an example, operation 235 may be performed by the fusion between an embedding vector generated before the HCF score 232 is calculated by the HCF DNN 231 and an embedding vector generated before the image score 234 is calculated by the image DNN 233. In this example, the fusion of the embedding vectors may be performed by a separate neural network that performs fusion, other than the HCF DNN 231 and the Image DNN 233. In the case of fusing the embedding vectors, the embedding vectors and information regarding whether the embedding vectors have high confidence or low confidence may be transmitted together to the separate neural network.

Figure 7A:
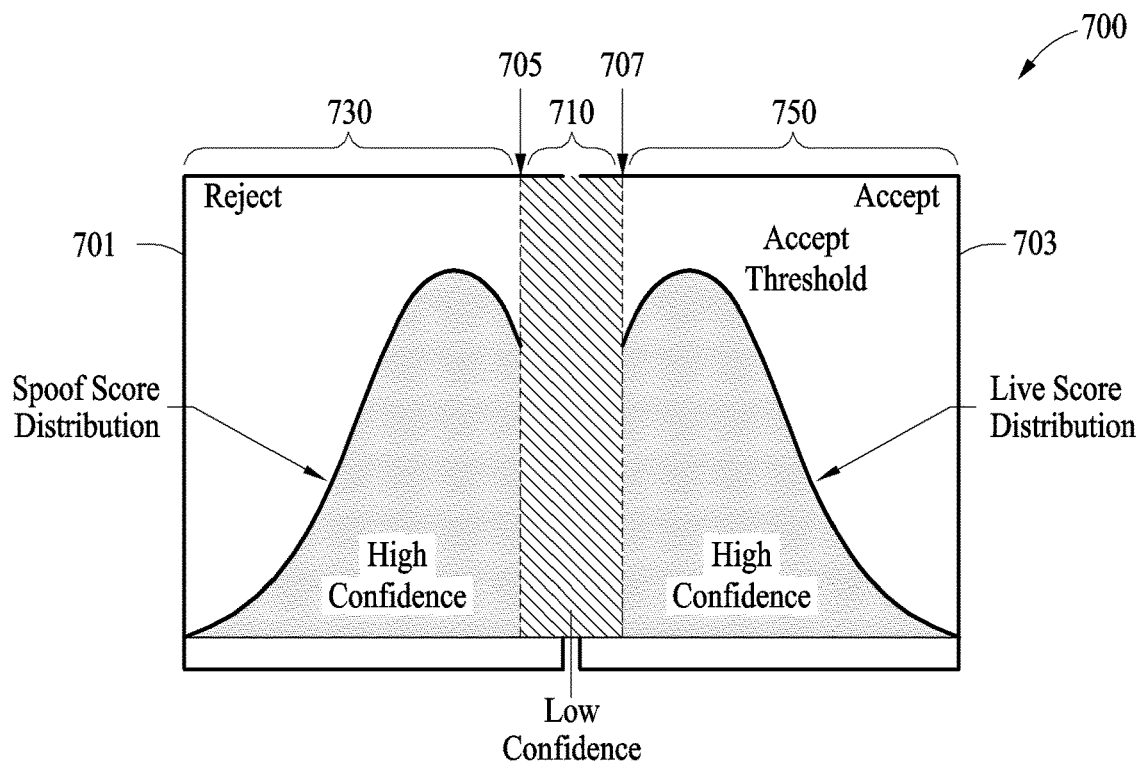
FIGS. 7A and 7B illustrate examples second threshold range, in accordance with one or more embodiments.
Figure 7B:
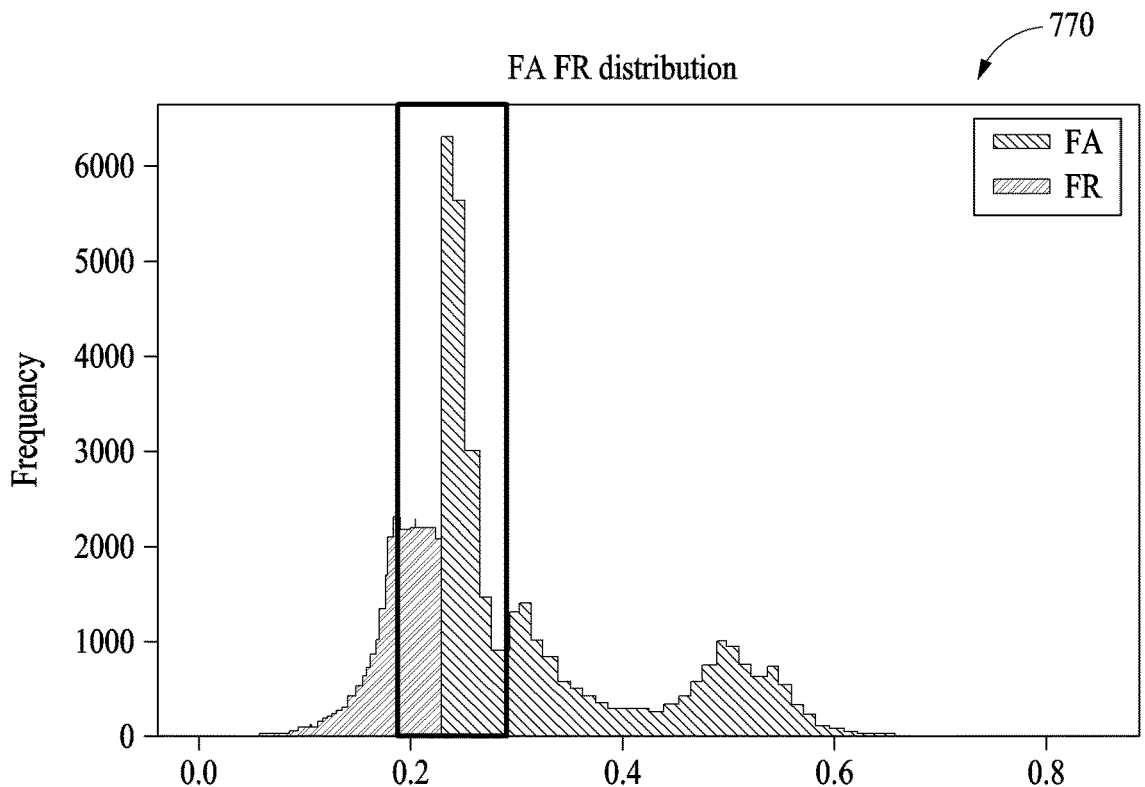

FIGS. 7A and 7B illustrate examples of a second threshold range.

Referring to FIG. 7A, graph 700 illustrates respective graphs of distributions of scores for which biometric information is determined as spoof information, and distributions of scores for which biometric information is determined as live information. In graph 700, a graph 701 illustrating a distribution of a first score for which biometric information is determined as spoof information, and a graph 703 illustrating a distribution of a first score for which biometric information is determined as live information, are illustrated.

The graph 701 may correspond to the probability distribution of the first score for which the biometric information is determined as spoof information, and the graph 703 may correspond to the probability distribution of the first score for which the biometric information is determined as live information. In this example, in a section 730 of the graph 701, the first score may be determined to fall within the range in which biometric information is determined as spoof information with high confidence. Further, in a section 750 of the graph 703, the first score may be determined to fall within the range in which biometric information is determined as live information with high confidence. The sections 730 and 750 may be sections in which the confidence is accepted, that is, sections that fall within a second threshold range.

On the other hand, in the middle section 710, there may occur frequent false acceptance (FA) that falsely accepts biometric information as live information although the first score falls within the section in which biometric information is determined as spoof information, and frequent false rejection (FR) that falsely rejects biometric information as spoof information although the first score falls within the section in which biometric information is determined as live information. The section 710 may be a section that does not fall within the second threshold range, that is, a section that is out of the second threshold range. In this example, FA and FR may occur at a point at which the FAR and the FRR match in the graph 770 of FIG. 7B, that is, at a point of an equal error rate (EER), for example, 0.22. The FAR and the FRR may be in inverse proportion. The second threshold range may be determined based on a point 707 at which the FAR is 0.22 in the graph 701 and a point 705 at which the FRR is 0.22 in the graph 703. The second threshold range may be determined based on, for example, a third threshold (for example, 0.22) corresponding to the point at which the FAR and the FRR match.

Figure 8:
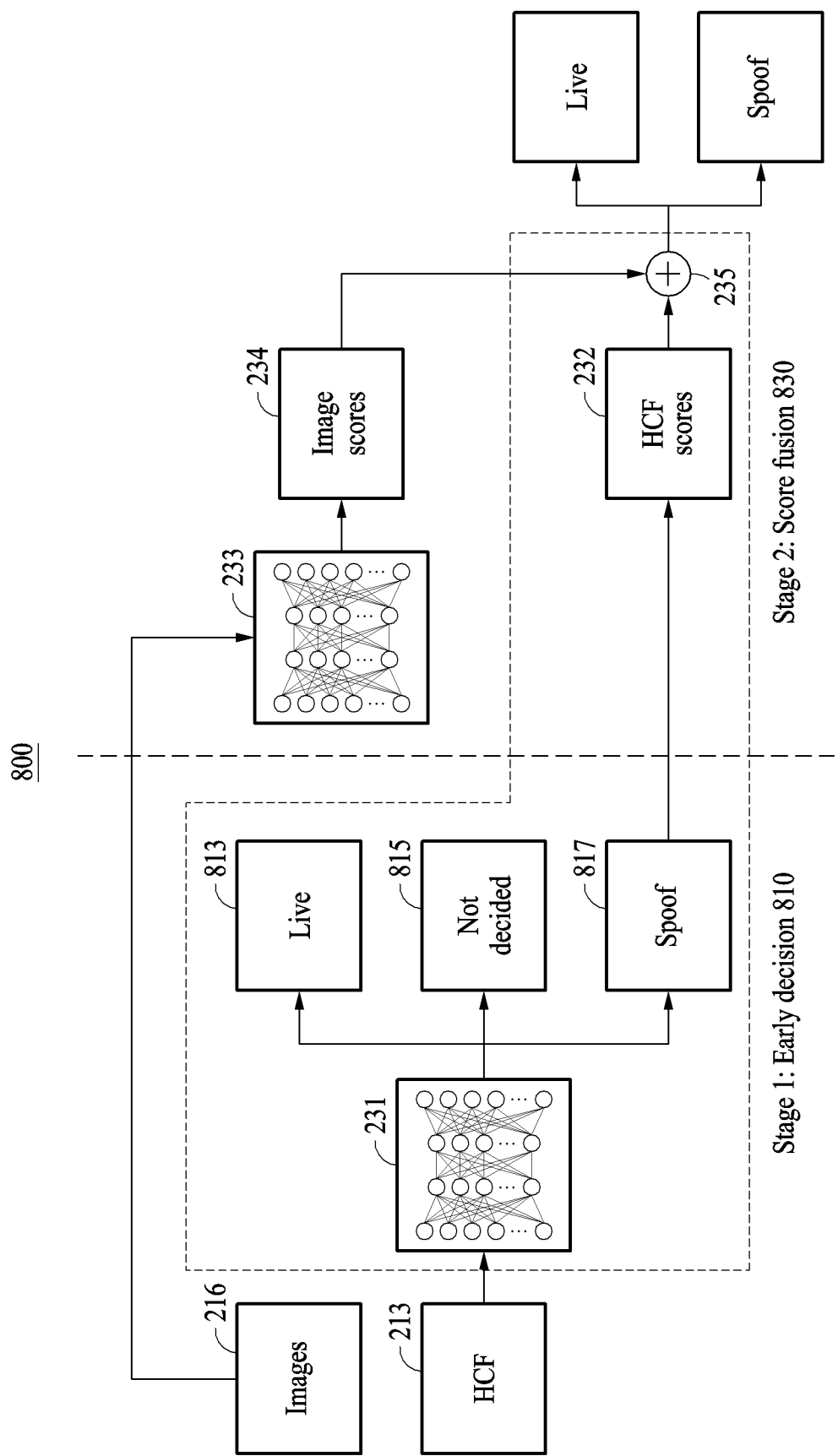
FIG. 8 illustrates an example structure of a multi-stage decision logic for detecting whether biometric information is spoofed, in accordance with one or more embodiments.

FIG. 8 illustrates an example of a structure of a multistage decision logic that detects whether biometric information is spoofed, in accordance with one or more embodiments.

Referring to FIG. 8, the cascade score fusion process performed by a detection apparatus 800 is illustrated.

In response to the completion of feature extraction, the detection apparatus 800 may determine whether biometric information is spoofed through two stages, an early decision stage 810, and a score fusion stage 830.

In the early decision stage 810, the detection apparatus 800 may calculate the HCF score 232 by applying the HCF 213 to the HCF DNN 231, and determine a range within which the HCF score 232 falls, among live information 813, not decided information 815, and spoof information 817. The HCF DNN 231 may be a neural network that calculates the HCF score 232 based on the HCF 213, and classifies the HCF score 232 as the live information 813, the not decided information 815, or the spoof information 817. The HCF DNN 231 may be, for example, a lightened network trained to perform early decision described above, or may be the classifier 410 described above.

In the early decision stage 810, the detection apparatus 800 detects whether the biometric information is spoofed using the lightened network 231. Thus, the amount of information and/or the capacity of the network 231 is limited when compared to the image DNN 233 used for score fusion 830. Therefore, the detection apparatus 800 determines whether the biometric information is spoofed if a determination that the biometric information is spoofed is clearly ascertained through the HCF DNN 231 in the early decision stage 810, and if not, defers a determination on whether the biometric information is spoofed to be determined in the score fusion stage 830.

In the score fusion stage 830, the detection apparatus may finally determine whether the biometric information is spoofed by fusing or combining the HCF score 232, calculated based on the HCF 213, and the image score 234 in operation 235. In the score fusion stage 830, the detection apparatus may fuse only a high confidence HCF score 232 with the image score 234, as described above with reference to FIG. 6.

Figure 9:
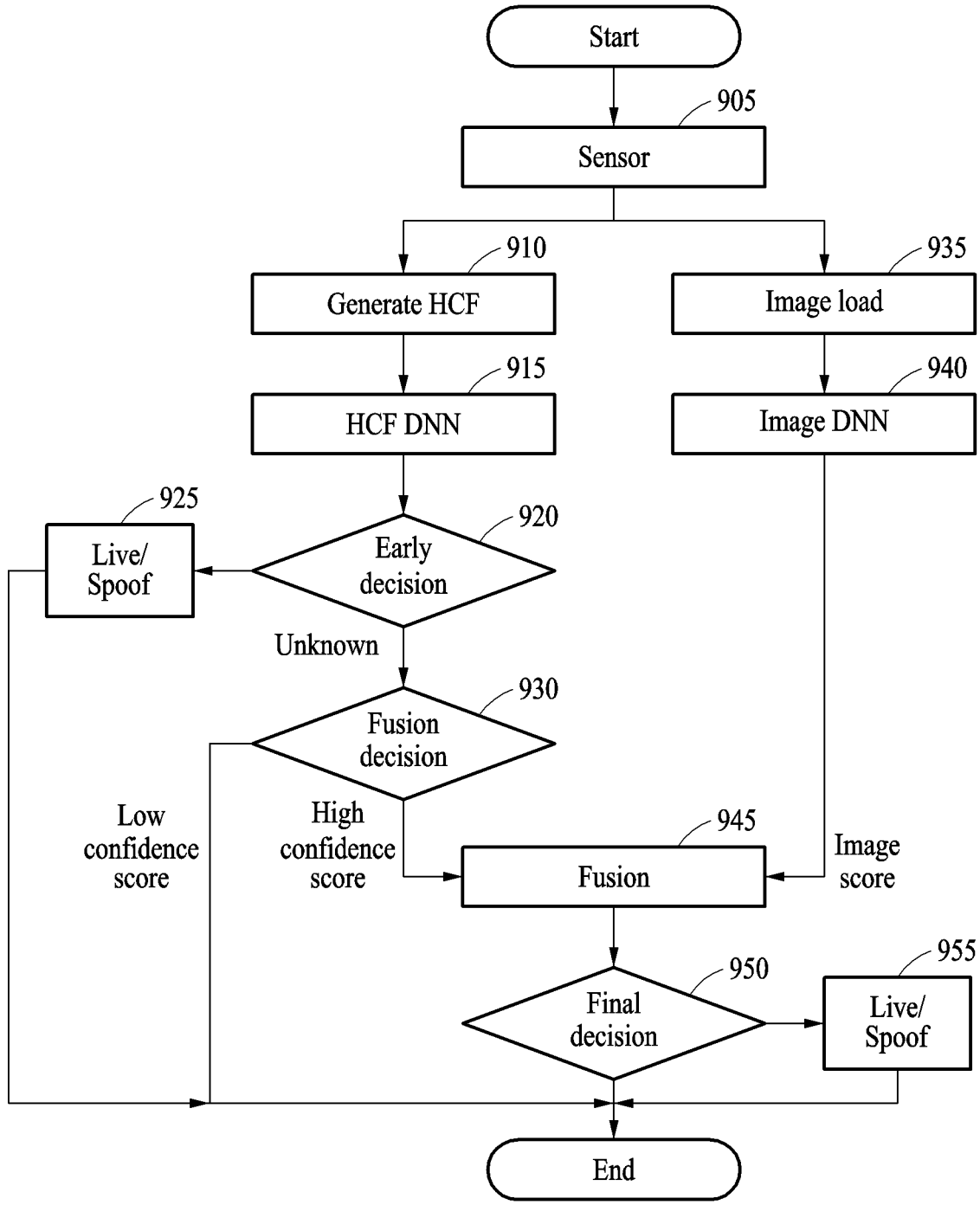
FIG. 9 illustrates an example method of detecting whether biometric information is spoofed, in accordance with one or more embodiments.

FIG. 9 illustrates an example method of detecting whether biometric information is spoofed, in accordance with one or more embodiments. The operations in FIG. 9 may be performed in the sequence and manner as shown, although the order of some operations may be changed or some of the operations omitted without departing from the spirit and scope of the illustrative examples described. Many of the operations shown in FIG. 9 may be performed in parallel or concurrently. One or more blocks of FIG. 9, and combinations of the blocks, can be implemented by special purpose hardware-based computer that perform the specified functions, or combinations of special purpose hardware and computer instructions. In addition to the description of FIG. 9 below, the descriptions of FIGS. 1-8 are also applicable to FIG. 9, and are incorporated herein by reference. Thus, the above description may not be repeated here.

Referring to FIG. 9, the process of detecting whether biometric information is spoofed by a detection apparatus through operations 905 to 955 is illustrated.

In operation 905, the detection apparatus may receive information sensed by a sensor. In an example, the detection apparatus may receive a physical value, such as, but not limited to, oxygen saturation, impedance, face depth information, electrical resistance, temperature (body temperature), heart rate, and/or similar image information.

In operation 910, the detection apparatus may extract an HCF from the received information.

In operation 915, the detection apparatus may calculate an HCF Score from the extracted HCF through an HCF DNN.

In operation 920, the detection apparatus may perform an early decision process based on the calculated HCF Score. In operation 925, the detection apparatus may detect whether biometric information is spoofed by determining whether the biometric information is live information or spoof information based on the HCF score. The detection apparatus may transmit information for which whether the biometric information is live information or spoof information is not determined in the early decision operation 920, to the following process, that is, the fusion decision operation 930.

In operation 930, the detection apparatus may determine whether the received information has a score the confidence of which is higher than a preset criterion. If the information has a score the confidence of which is higher than the preset criterion, the detection apparatus may transmit the high confidence score to fusion operation 945. In this example, a low confidence score may be excluded from the fusion operation.

Additionally, the detection apparatus may load an image in operation 935. In an example, operations 910 and 935 may be performed concurrently or at a predetermined time interval. In operation 940, the detection apparatus may calculate an image score through an image DNN.

In operation 945, the detection apparatus may calculate one final score by fusing the high confidence score with the image score.

In operation 950, the detection apparatus may determine whether the biometric information is live information or spoof information based on the calculated final score. In operation 955, the detection apparatus may detect whether the biometric information is spoofed.

Figure 10:
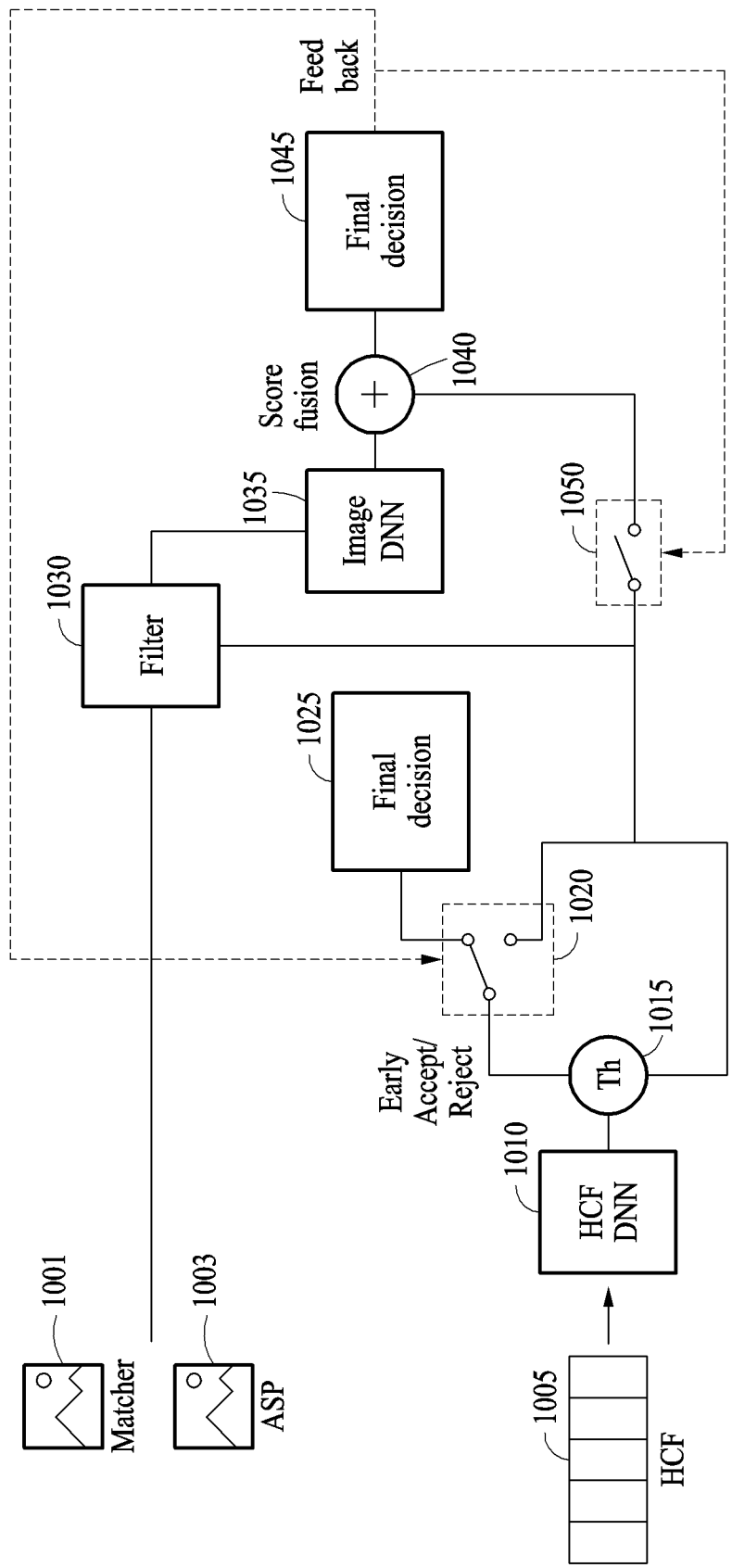
FIG. 10 illustrates an example of applying an apparatus that detects whether biometric information is spoofed to a terminal, in accordance with one or more embodiments.

FIG. 10 illustrates an example of applying an apparatus to detect whether biometric information is spoofed to a terminal.

Referring to FIG. 10, a terminal that performs the early decision process and the score fusion process described above is illustrated. The terminal may include the detection apparatus described above, or may include the function of the detection apparatus.

The terminal may obtain an image 1001 from a matcher that performs the matching process of verifying whether a user attempting user authentication with biometric information (for example, a fingerprint) has the authority to access a system, that is, is an enrolled user of the system. Additionally, after the matching process, the terminal may obtain an image 1003 from ASP that determines whether the biometric information is live information or spoof information. The image 1001 and the image 1003 may have a predetermined time difference therebetween.

Additionally, the terminal may calculate a first score by applying an HCF 1005 obtained from the sensor to an HCF DNN 1010. In this example, the terminal may transmit, to the HCF DNN 1010, dynamic features extracted from the image 1001 and the image 1003 through filtering by a filter 1030, or may transmit, to an image DNN 1035, second feature information extracted from the image 1001 and the image 1003.

In an example, in response to the determination that a first score falls within a first threshold range, the terminal may early determine whether the biometric information is spoofed based on the first score by turning on a switch 1020, in operation 1025. In this example, thresholds (for example, a first threshold and a second threshold) (Th) 1015 for determining the first threshold range may be adjusted through feedback according to the result of the final decision 1045, which will be described later, or may be adjusted in a user-customized manner. When the thresholds 1015 are adjusted, a determination whether to perform the early decision process 1025 may be activated by turning on/off the switch 1020 based on the thresholds 1015.

When the early decision process 1025 is not performed, the detection apparatus may calculate a second score based on the second feature information transmitted to the image DNN 1035. In this example, the terminal may fuse the first score with the second score by turning on the switch 1050, in operation 1040. The terminal may perform a final decision through the fusion of the first score and the second score, in operation 1045.

In an example, it is possible to determine whether to activate the spoofing detection function by turning on/off the switch 1020 to perform the early decision process 1025 and the score fusion process 1040 through a control variable. In this example, the terminal may refer to the result of final decision 1045 to activate the spoofing detection function in early decision 1025.

Further, in an example, optimal thresholds for the first threshold range and/or the second threshold range may be derived for each terminal through adaptive learning, and the function to perform the early decision process 1025 and the score fusion process 1040 may be activated if the early decision process 1025 and the score fusion process 1040 help to improve the performance.

Figure 11:
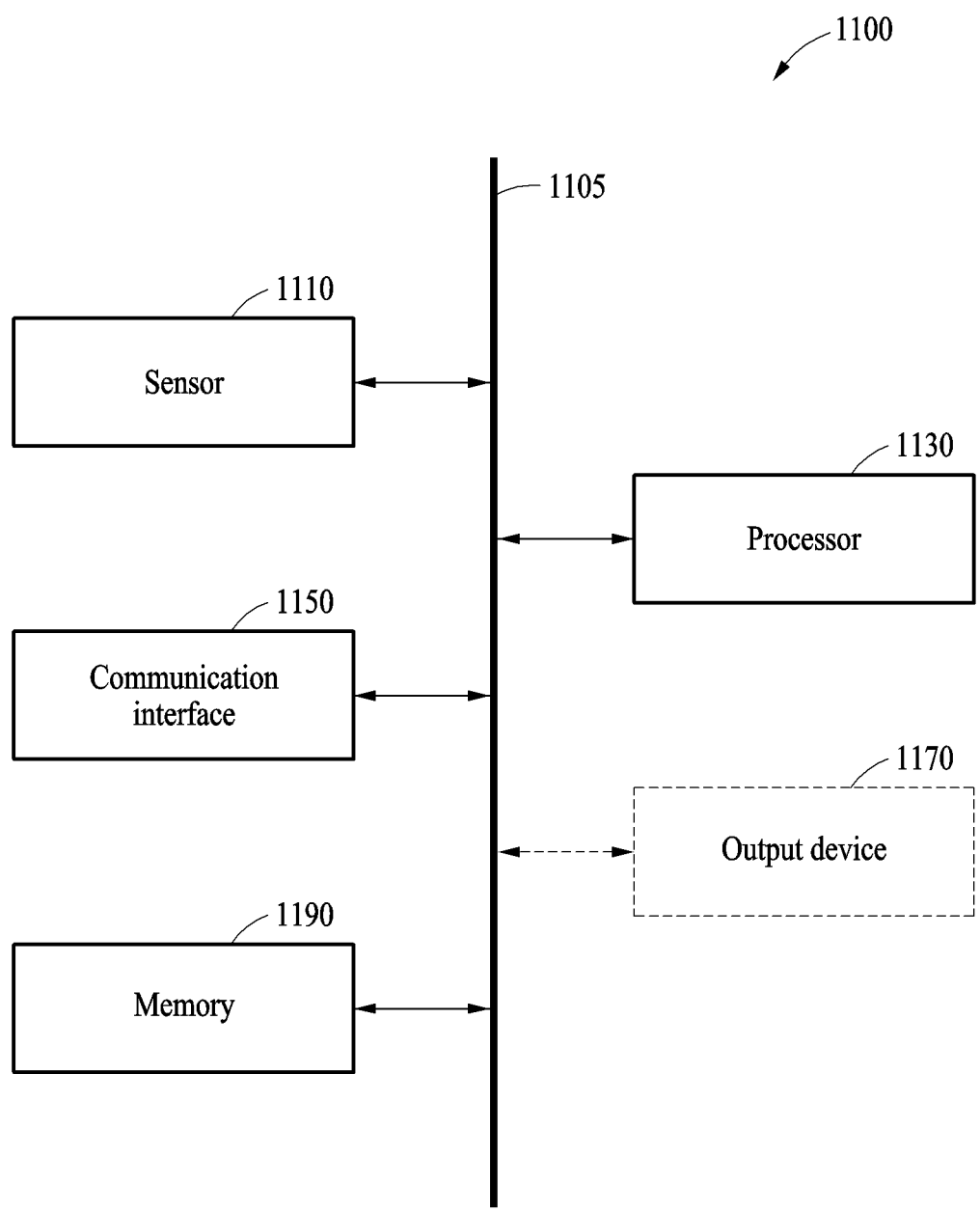
FIG. 11 illustrates an example apparatus that detects whether biometric information is spoofed, in accordance with one or more embodiments.

FIG. 11 illustrates an example of an apparatus that detects whether biometric information is spoofed. Referring to FIG. 11, an apparatus 1100 that detects whether biometric information is spoofed (hereinafter, the "detection apparatus") may include a sensor 1110, a communication interface 1150, a processor 1130, an output device 1170, and a memory 1190. The sensor 1110, the communication interface 1150, the processor 1130, the output device 1170, and the memory 1190 may be connected to each other through a communication bus 1105.

The sensor 1110 senses biometric information of a user. The sensor 1110 may include, as non-limiting examples, any one or any combination of an ultrasonic fingerprint sensor, a depth sensor, an image sensor, an iris scanner, or a facial recognition sensor. However, examples are not limited thereto. The biometric information may include, as non-limiting examples, any one of a fingerprint, an iris, and a face of the user. However, examples are not limited thereto.

The communication interface 1150 receives, from the sensor 1110, a static feature related to the biometric information of the user and images related to the biometric information. In an example, the communication interface 1150 may output the biometric information and/or the images related to the biometric information received from the sensor 1110 to the outside of the detection apparatus 1100. Additionally, the communication interface 1150 may transmit information regarding whether the biometric information is spoofed, detected by the processor 1130, together with the biometric information to another device, or output the same to the outside of the detection apparatus 1100. In this example, the biometric information and whether the biometric information is spoofed may be matched with each other.

The processor 1130 obtains first feature information including the static feature received through the communication interface 1150 and a dynamic feature extracted based on the images. The processor 1130 detects whether the biometric information is spoofed based on a first score calculated based on the first feature information. Further, the processor 1130 fuses the first score and a second score calculated based on second feature information extracted from the images, based on a result of determining whether the biometric information is spoofed based on the first score. The processor 1130 detects whether the biometric information is spoofed based on a fused score.

However, the operation of the processor 1130 is not limited thereto. Alternatively, the processor 1130 may perform the above operation together with at least one of the operations described above with reference to FIGS. 1 to 10.

The processor 1130 may be a neural network or detection apparatus implemented by hardware including a circuit having a physical structure to perform desired operations. In an example, the desired operations may include instructions or codes included in a program. In an example, the hardware-implemented detection apparatus may include a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The processor 1130 may execute the program and control the detection apparatus 1100. Program codes to be executed by the processor 1130 may be stored in the memory 1190.

The apparatuses, units, modules, devices, and other components described herein, are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The output device 1170 may output whether the biometric information is spoofed, detected by the processor 1130. The output device 1170 may include, for example, a display, an alarm, a speaker, or other various types of output devices for informing the user of whether the biometric information is spoofed.

The memory 1190 may store the biometric information of the user sensed by the sensor 1110, that is, the static feature related to the biometric information of the user and the images obtained by capturing the biometric information. Further, the memory 1190 may store the first feature information and/or the second feature information obtained by the processor 1150. The memory 1190 may store the first score, the second score, and the fused score calculated by the processor 1130. In addition, the memory 1190 may store the biometric information and whether the biometric information is spoofed, detected by the processor 1150, by matching them to each other.

The memory 1190 may store a variety of information generated in the processing process of the processor 1130 described above. In addition, the memory 1190 may store a variety of data and programs. The memory 1190 may include a volatile memory or a non-volatile memory. The memory 1190 may include a large-capacity storage medium such as a hard disk to store a variety of data.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A biometric information spoofing detection method, the method comprising:
   receiving, from a sensor, first feature information including a static feature associated with biometric information of a user, and a dynamic feature obtained based on images associated with the biometric information;
   determining whether the biometric information is spoofed based on a first score generated from the first feature information;
   when a result of the determining is that the biometric information is spoofed, generating a fused score by fusing the first score with a second score generated from second feature information extracted from the images and selectively, based on the fused score, determining that the biometric information is spoofed based on the fused score; and
   when the result of the determination is that the biometric information is not spoofed and the first score is within a second threshold range, performing the generating of the fused score and performing the selective determining.

2. The method of claim 1, wherein the determining whether the biometric information is spoofed based on the first score comprises:
   generating the first score based on the first feature information;
   determining whether the first score is in a first threshold range for an early decision that the biometric information is spoofed; and
   determining whether the biometric information is spoofed based on the first score, in response to the determining that the first score is in the first threshold range,
   wherein the fusing of the calculated first score with the second score, and the detecting that the biometric information is spoofed based on the fused score is not performed, in response to the determination that the first score falls within the first threshold range.

3. The method of claim 1, wherein the receiving of the first feature information comprises:
   receiving the static feature from the sensor that senses the biometric information of the user; and
   receiving the dynamic feature based on a difference between image features extracted from the images.

4. The method of claim 3, wherein the receiving of the dynamic feature comprises:
   receiving the images;
   extracting the image features from the images; and
   generating the dynamic feature based on a difference between the extracted image features.

5. The method of claim 4, wherein the receiving of the images comprises one of:
   receiving the images by sequentially capturing the images with a time difference between the images with the sensor; and
   receiving the images by performing image processing on an image captured with the sensor.

6. The method of claim 1, wherein the determining of whether the biometric information is spoofed based on the first score, comprises classifying the biometric information corresponding to the first score as spoof information or live information based on a trained classifier.

7. The method of claim 1, wherein the fusing of the first score with the second score comprises fusing the first score with the second score in response to a determination that the first score is not within a first threshold range for an early decision that the biometric information is spoofed.

8. The method of claim 1, wherein the sensor comprises any one or any combination of an ultrasonic fingerprint sensor, a depth sensor, and an image sensor.

9. The method of claim 1, wherein the biometric information comprises one of a fingerprint, an iris, and a face of the user.

10. A non-transitory computer-readable storage medium storing instructions that, when executed by a processor, cause the processor to perform the method of claim 1.

11. An apparatus that detects whether biometric information is spoofed, the apparatus comprising:
   a sensor, configured to sense biometric information of a user;
   a communication interface, configured to receive, from the sensor, a static feature associated with the biometric information of the user, and images associated with the biometric information of the user; and
   a processor, configured to:
      receive first feature information including the static feature, and a dynamic feature obtained based on the images;
      determine whether the biometric information is spoofed based on a first score generated based on the first feature information;

when a result of the determining is that the biometric information is spoofed, generating a fused score by fusing the first score with a second score generated based on second feature information extracted from the images and selectively, based on the fused score, determine that the biometric information is spoofed based on the fused score; and when the result of the determination is that the biometric information is not spoofed and the first score is within a second threshold range, performing the generating of the fused score and performing the selective determining.

12. The apparatus of claim 11, wherein the processor is further configured to:
generate the first score based on the first feature information,
determine whether the first score is in a first threshold range for an early decision that the biometric information is spoofed,
determine whether the biometric information is spoofed based on the first score, in response to the determining that the first score is in the first threshold range, and
omit the fusing of the first score with the second score and the determining that the biometric information is spoofed based on the fused score, in response to the determining that the first score is in the first threshold range.

13. The apparatus of claim 11, wherein the processor is further configured to receive the static feature from the sensor that senses the biometric information of the user, and receive the dynamic feature based on a difference between image features extracted from the images.

14. The apparatus of claim 13, wherein the processor is further configured to receive the images, extract the image features from the images, and generate the dynamic feature based on a difference between the extracted image features.

15. The apparatus of claim 13, wherein the processor is further configured to receive the images by sequentially capturing the images with a time difference between the images with the sensor, and receive the images by performing image processing on an image captured with the sensor.

16. The apparatus of claim 11, wherein the processor is further configured to classify the biometric information corresponding to the first score as spoof information or live information based on a trained classifier.

17. The apparatus of claim 11, wherein the processor is further configured to fuse the first score with the second score in response to a determination that the first score is not within a first threshold range for an early decision that the biometric information is spoofed.

18. The apparatus of claim 11, wherein the sensor comprises any one or any combination of an ultrasonic fingerprint sensor, a depth sensor, and an image sensor.

19. The apparatus of claim 11, wherein the biometric information comprises one of a fingerprint, an iris, and a face of the user.

20. The apparatus of claim 11, further comprising:
an output device, configured to output a notification that the biometric information is spoofed.

* * * * *